United States Patent
Bonin (12)

(10) Patent No.: US 6,731,471 B1
(45) Date of Patent: May 4, 2004

(54) LOW MASS MICROACTUATOR AND METHOD OF MANUFACTURE

(75) Inventor: Wayne A. Bonin, North Oaks, MN (US)

(73) Assignee: Seagate Technology LLC, Shakopee, MN (US)

( * ) Notice: Subject to any disclaimer, the term of this patent is extended or adjusted under 35 U.S.C. 154(b) by 798 days.

(21) Appl. No.: 09/148,239

(22) Filed: Sep. 4, 1998

Related U.S. Application Data
(60) Provisional application No. 60/078,866, filed on Mar. 20, 1998.

(51) Int. Cl.[7] .................................. G11B 5/48
(52) U.S. Cl. .................................... 360/294.3
(58) Field of Search ................. 360/106, 103; 310/309; 361/283

(56) References Cited

U.S. PATENT DOCUMENTS

| | | | | |
|---|---|---|---|---|
| 5,025,346 A | * | 6/1991 | Tang et al. | 361/283 |
| 5,753,911 A | * | 5/1998 | Yasuda et al. | 250/306 |
| 5,834,864 A | * | 11/1998 | Hesterman et al. | 310/40 |
| 5,943,189 A | * | 8/1999 | Boutaghou et al. | 360/103 |
| 5,995,334 A | * | 11/1999 | Fan et al. | 360/106 |
| 5,998,906 A | * | 12/1999 | Jerman et al. | 310/309 |

FOREIGN PATENT DOCUMENTS

| | | | |
|---|---|---|---|
| JP | 6-160750 A | * | 6/1994 |
| JP | 6-188497 | * | 7/1994 |

OTHER PUBLICATIONS

Imamura et al, Transvers Mode Elevtrostatic Microactuator for MEMS–Based HDD Slider, Feb. 11–15, 1996, Proceedings of IEEE 9th Workshop on MEMS, pp. 216–221.*

S. Nakamura, K. Suzuki, M. Ataka and H. Fujita, "An Electrostatic Micro Actuator for a Magnetic Head Tracking System of Hard Disk Drives", 1997 International Conference on Solid–State Sensors and Actuators, Chicago, Jun. 16–19, 1997, pp. 1081–1084.

* cited by examiner

*Primary Examiner*—Tianjie Chen
(74) *Attorney, Agent, or Firm*—Joseph R. Kelly; Westman, Champlin & Kelly, P.A.

(57) ABSTRACT

A disc drive includes a disc mounted to a motor, an access arm, and a slider connected to the access arm. A comb-type microactuator is mounted on the slider and a transducer is mounted to the microactuator such that actuation of the microactuator moves the transducer relative to the slider.

18 Claims, 10 Drawing Sheets

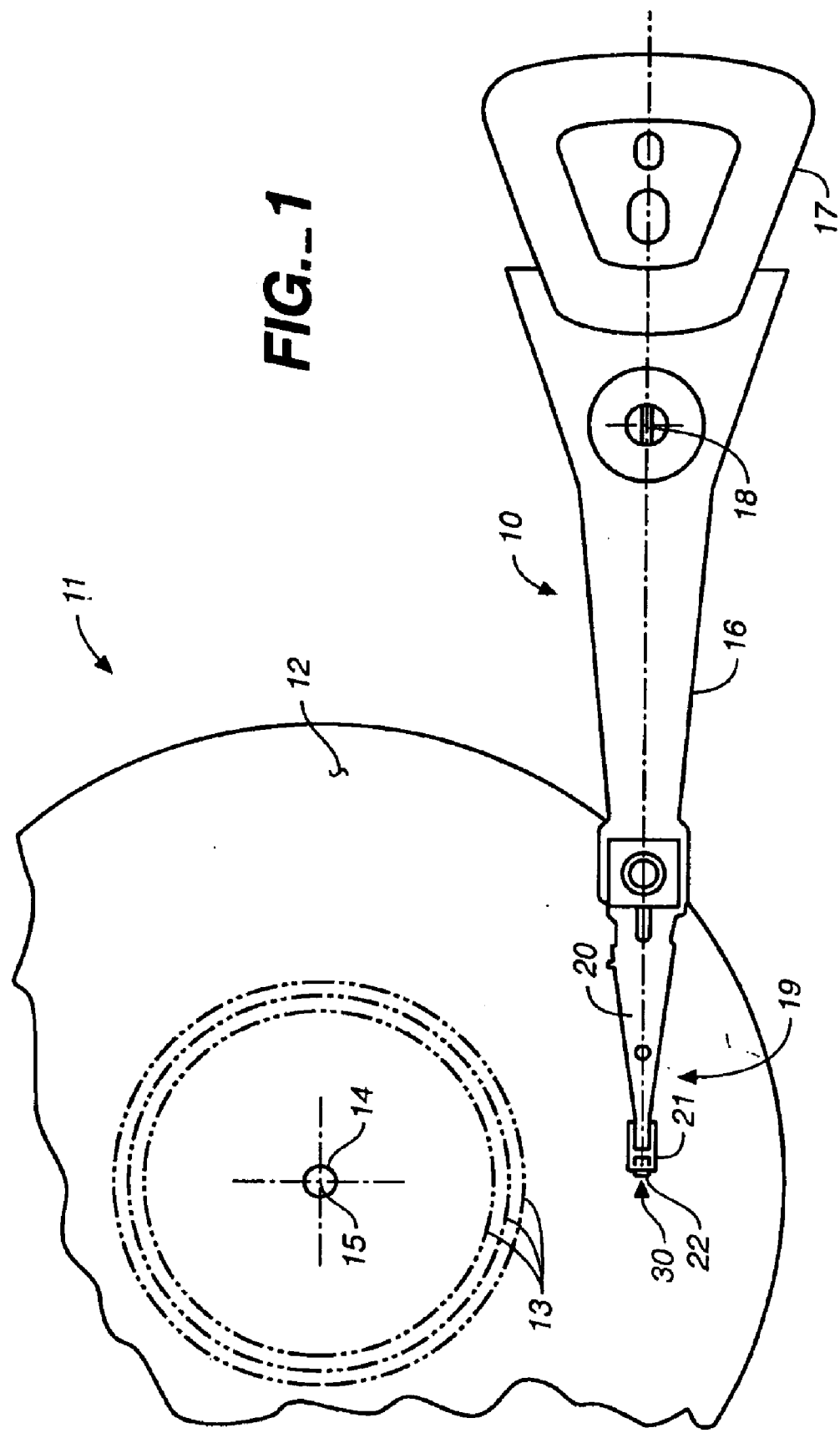

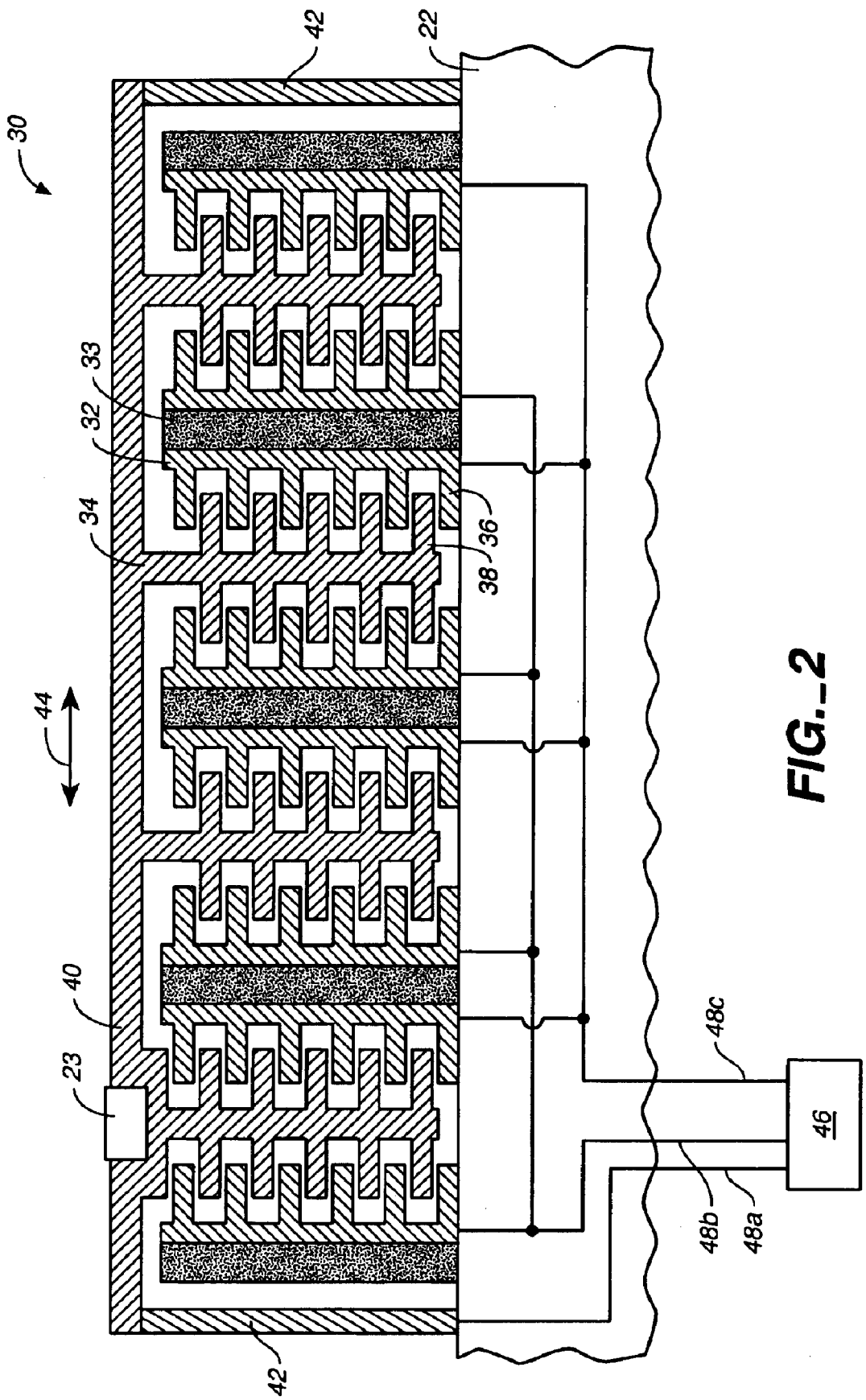
FIG._2

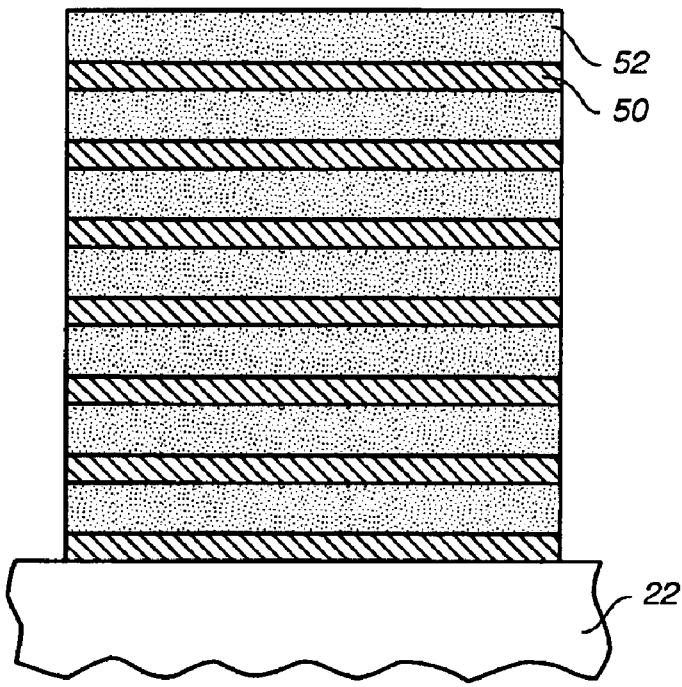
FIG._3
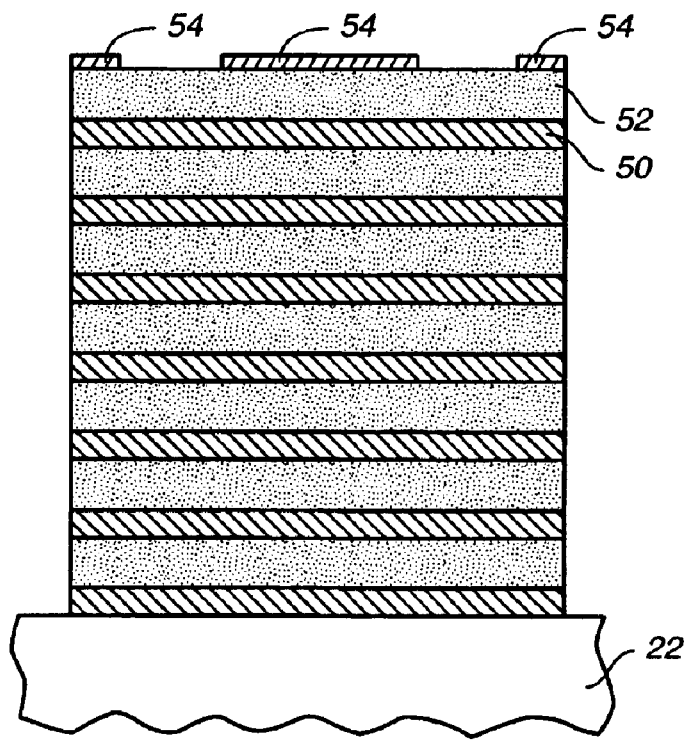
FIG._4

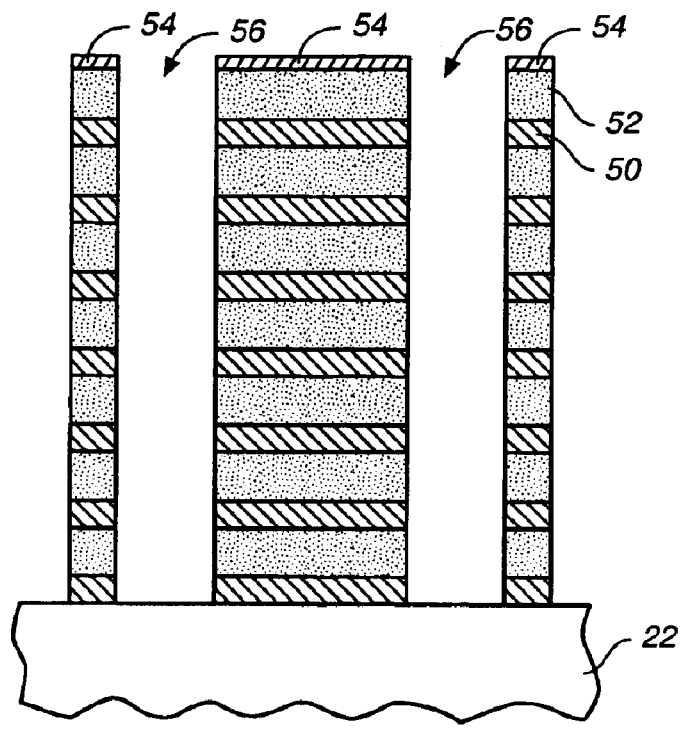
FIG._5
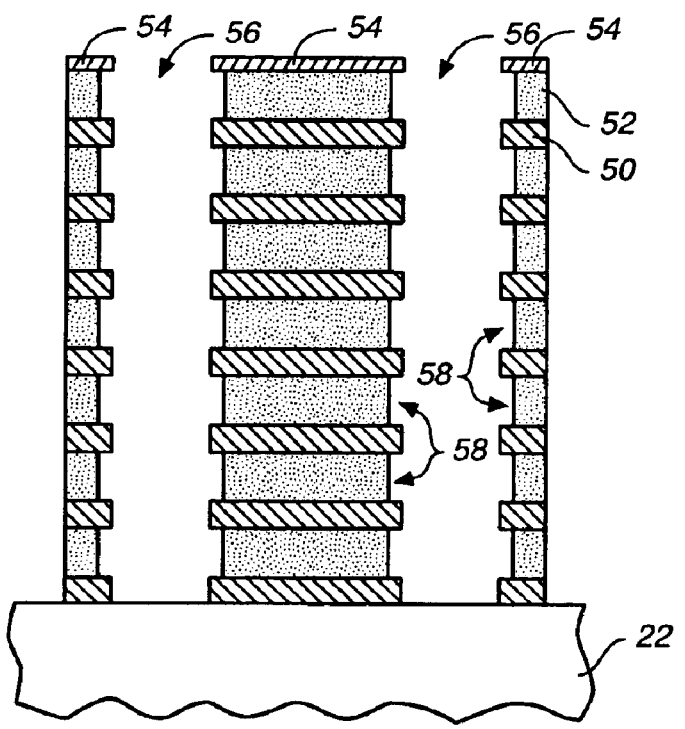
FIG._6

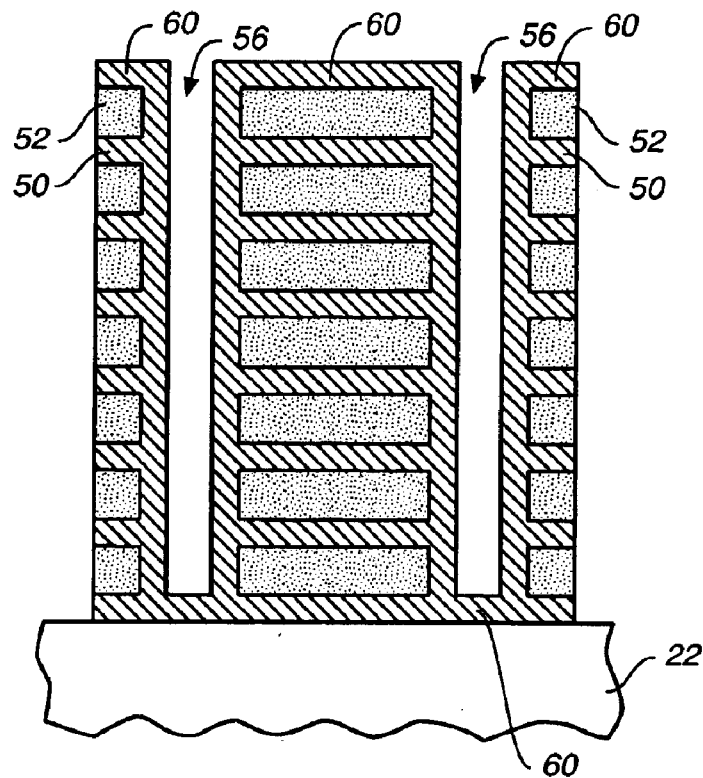
FIG._7
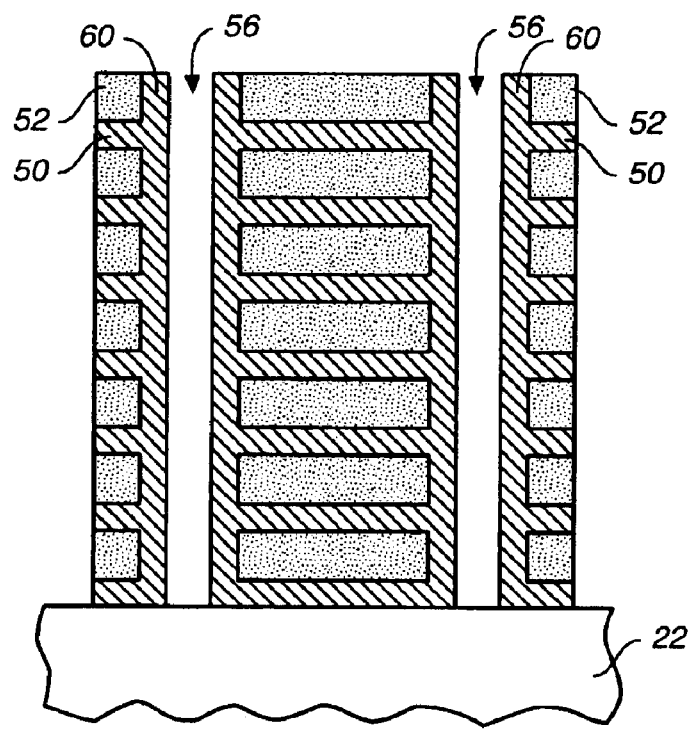
FIG._8

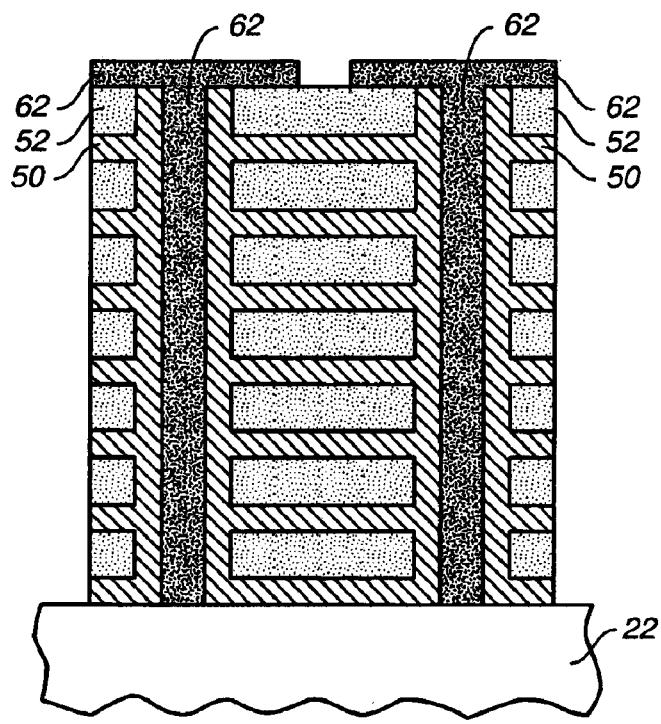
FIG._9
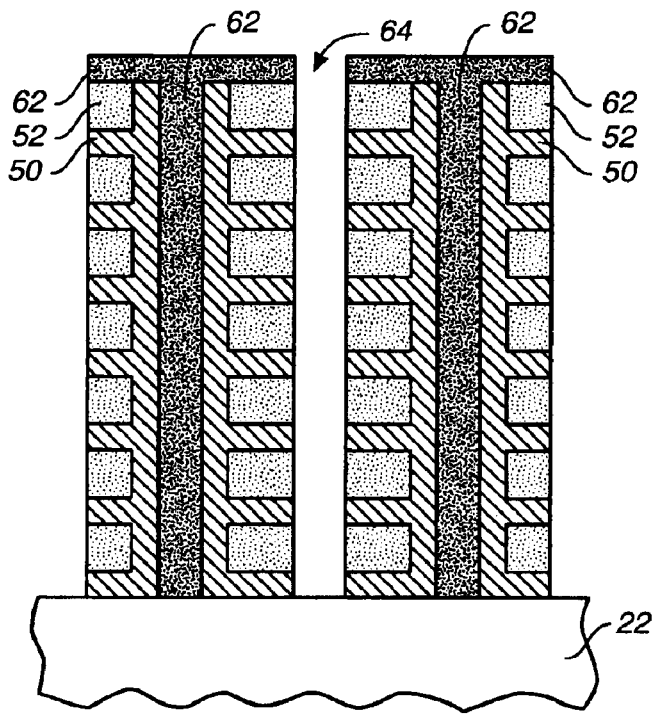
FIG._10

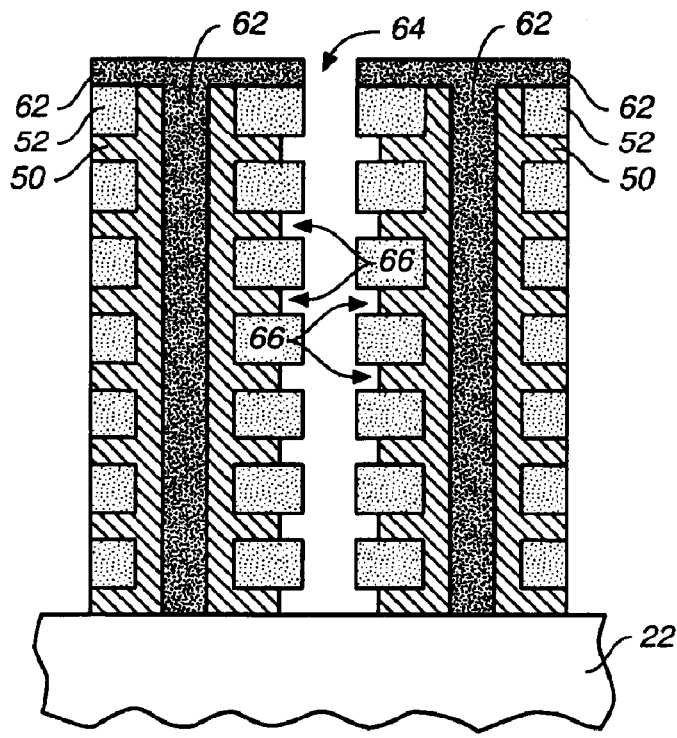
FIG._11
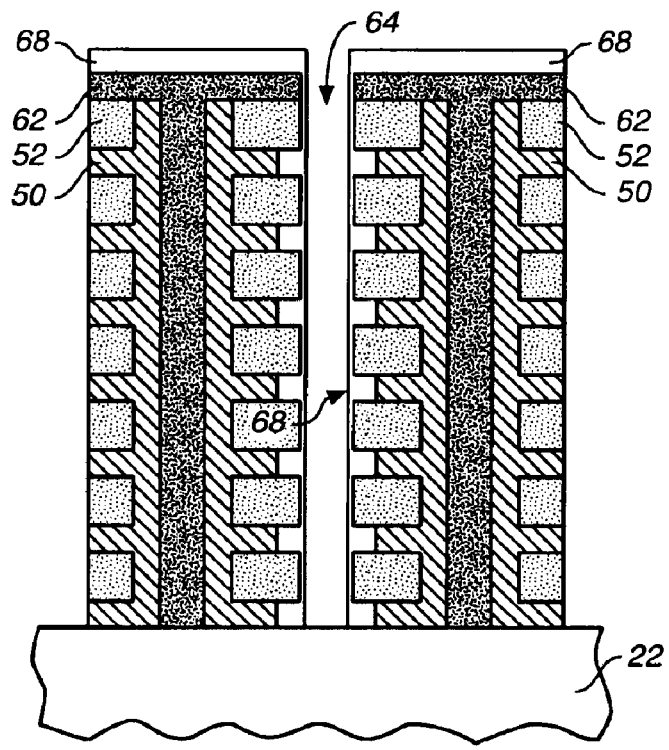
FIG._12

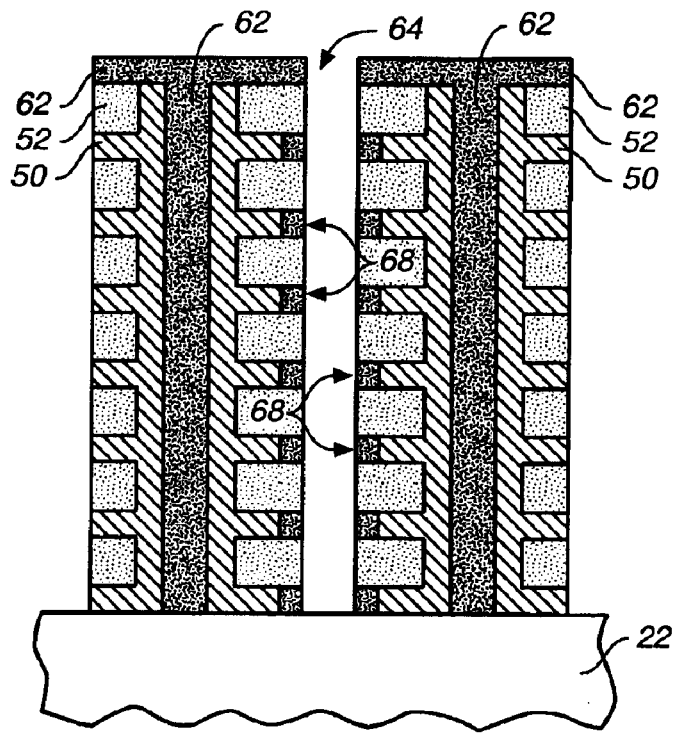
FIG._13
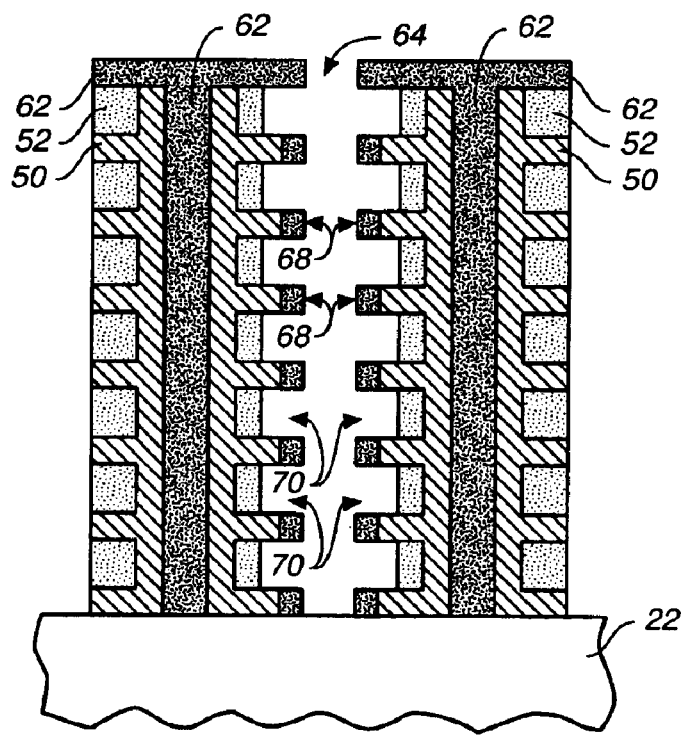
FIG._14

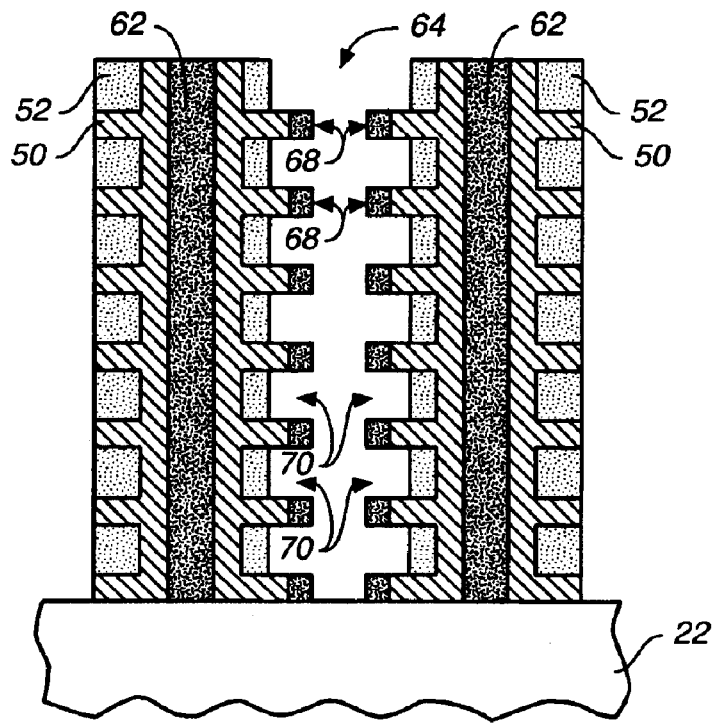
FIG._15
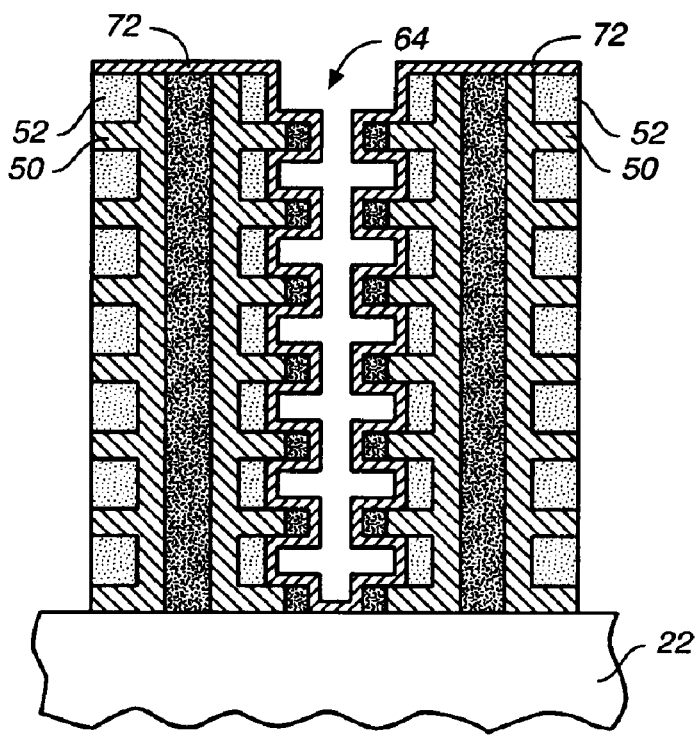
FIG._16

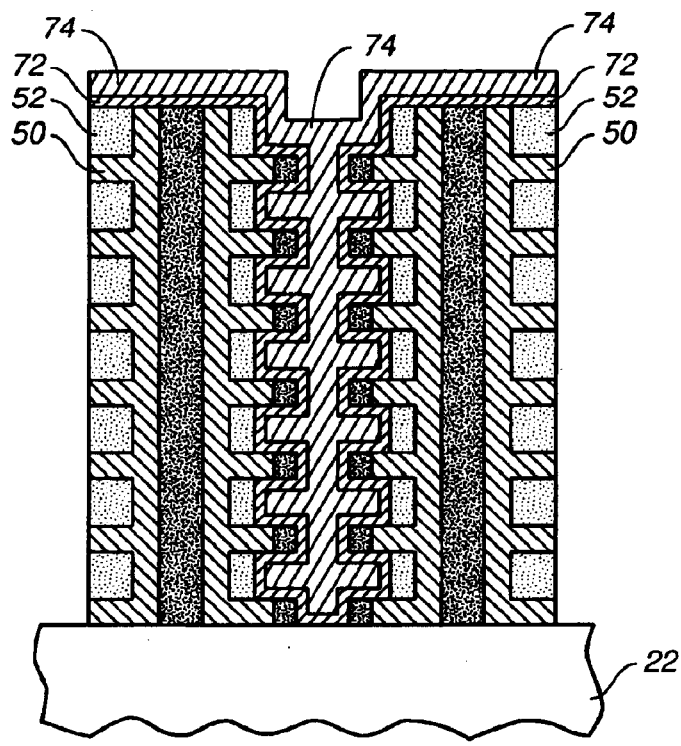
FIG._17
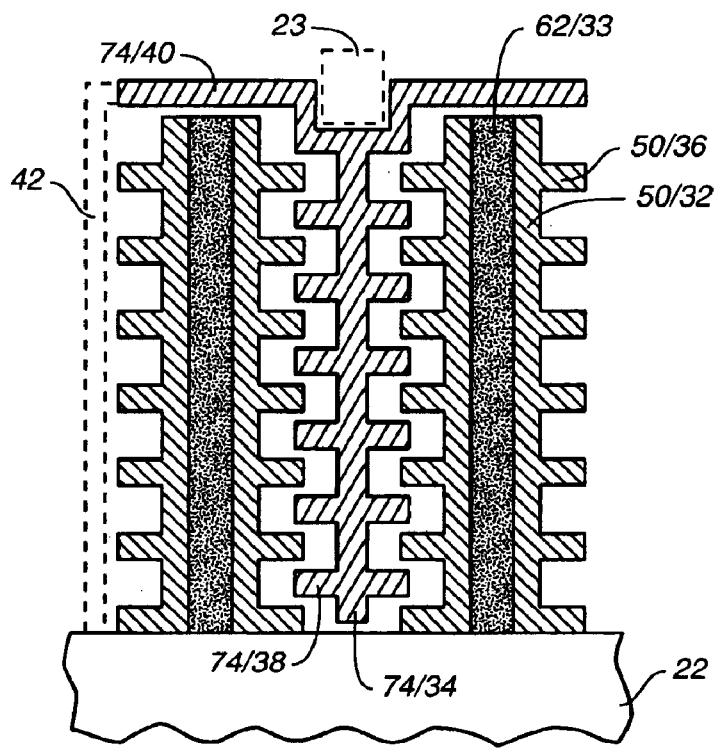
FIG._18

LOW MASS MICROACTUATOR AND METHOD OF MANUFACTURE

REFERENCE TO RELATED APPLICATION

This application claims priority to provisional application Ser. No. 60/078,866 filed Mar. 20, 1998 entitled SLIDER BASED ELECTROSTATIC COMB DRIVE MICROACTUATOR, and WAFER LEVEL FABRICATION PROCESS, the entire disclosure of which is hereby incorporated by reference.

BACKGROUND OF THE INVENTION

The present invention generally relates to the field of disc drives. More specifically, the present invention relates to the field of microactuators for use in disc drives.

Computer systems play a vital and integral role in our modern society and we have come to rely heavily on computer systems in our everyday life. From a simple home computer system to help us with our business, personal and entertainment needs, to a meteorological computer system that models atmospheric patterns to generate a weather forecast, to a traffic control computer system that helps maintain traffic flow, to a telecommunications computer system that routes thousands of telephone calls every minute, computers have a vast and significant impact on our everyday life that is difficult to comprehend.

A critical part of every computer system is a data storage system for storing bits of data or digital information. Electronic memory banks store limited quantities of data that may be useful in small scale computer systems. However, most computer systems utilize vast quantities of data that must be stored by a more practical means. Magnetic disc drives were developed to accommodate the need for a practical and efficient means to store large quantities of information.

Magnetic disc drives typically include one or more flat discs that have a magnetic medium coated on each surface. The magnetic surface on the disc may be modified to write information onto the disc or the magnetic field pattern on the surface may be detected to read information from the disc. In this manner, information may be stored on and retrieved from the disc.

Magnetic disc drives also typically include one or more magnetic heads that perform the reading and writing function. Each magnetic head is positioned over the disc surface at precise locations using an actuator assembly. With this arrangement, the surface of the disc may be divided into discrete tracks each defining a separate radial position on the disc surface. The actuator assembly moves the magnetic head over the desired track to read or write data at that location.

Disc drives have evolved into highly complex electromechanical systems involving many specialized components, rendering a more detailed description of a typical magnetic disc drive necessary for a full understanding of the present invention.

Magnetic disc drives generally utilize a plurality of rigid discs including a magnetizable medium coated on each side or surface of the disc. The discs are rigidly mounted on a spindle motor to form a stack of spaced-apart discs rotatable about the axis of the spindle motor. The discs are mounted such that the axis of the spindle motor (i.e., the axis of rotation) is orthogonal to the disc surface.

Adjacent each disc surface is a magnetic head or slider that "flies" above the disc due to aerodynamic or hydrodynamic lift. Each slider includes an air bearing surface facing the disc surface which creates the lift relative to the rotating disc surface. Each slider also includes one or more transducers that read and/or write to the magnetic medium on the disc surface. Inductive type transducers capable of both reading from and writing to the disc surface may be used alone or in conjunction with MR (magnetoresistive) type transducers capable of reading from the disc.

It is important that the slider remain in close proximity to the disc surface in order to maintain the proper interaction between the transducer(s) on the slider and the magnetic media on the disc surface. As such, it is necessary to compensate for the aerodynamic lift imposed on the slider. This may be accomplished by utilizing a pre-loaded suspension connected to the slider. The proximal end of the suspension is connected to a track accessing arm or primary actuator which is rotatable about an axis orthogonal to the disc surface but is fixed in all other directions. The distal end of the suspension is connected to the slider and exerts a normal force by elastic beam deflection in a direction opposite that of the aerodynamic lift.

The suspension includes a flexible portion referred to as a gimbal and a relatively rigid portion referred to as a load beam. The gimbal portion of the suspension allows the slider to move in the pitch and roll directions and is typically a separate part welded to the load beam portion of the suspension. The gimbal portion may be formed from a thinner material than the load beam to increase its pitch and roll compliance. Alternatively, the gimbal may be formed from partially etched material or from the load beam material itself. The load beam, which transfers the preload force to the slider, is typically made by forming stiffening webs or flanges along the longitudinal edges of the suspension. Alternatively, the rigid load beam portion may be formed by depositing circuit layers on the suspension material.

The pre-loaded force is typically on the order of 0.5 gmf to 4.0 gmf which allows the slider to fly above the disc surface when the disc is rotating at nominal speed, but otherwise causes the slider to be in contact with the disc surface. Because of the potential damage caused by friction between the slider and the rotating disc at sub-nominal speeds, a landing and take-off zone may be provided on the disc surface. The landing and take-off zone has a low coefficient of friction thus reducing the potential for damage to the slider.

The track accessing arm or primary actuator includes a proximally mounted voice coil and a distally mounted extension arm which is connected to the proximal end of the suspension. The voice coil interacts with a magnet to effect controlled rotation of the primary actuator about an axis of rotation (z-axis) orthogonal to the disc surface and disposed between the voice coil and the extension arm. In this manner, the primary actuator moves the slider from track to track across the surface of the disc.

The preload force is typically applied to the slider through a dimple or load button which bears on the back surface of the slider. Alternatively, the preload force is applied through the gimbal structure. The point of preload application is defined as the suspension load point.

In some instances, it is desirable to have a secondary actuator to make minor adjustments in the position of the slider. For example, it may be desirable to correct for off-track errors due to non-concentric tracks or skew angle variance. In addition, it may be desirable to correct for fly height variations due to changes in aerodynamic lift caused by a difference in disc surface speed (inside vs. outside tracks) or a difference in altitude. This may be accomplished by using a microactuator connected between the slider and the suspension for fine positioning of the slider.

Microactuators may also be useful for decreasing the access time of the drive. A microactuator capable of moving the slider to an adjacent track or across a number of tracks would enable seek operations to be performed using the microactuator only, which is faster than using the primary actuator.

SUMMARY OF THE INVENTION

The present invention provides a low mass comb-type microactuator positioned between the slider and the transducer. The low mass comb-type microactuator of the present invention allows relatively large travel with voltage-in/displacement out control.

The relatively low mass of the microactuator of the present invention enables the microactuator to operate at a resonant frequency many times higher than the servo frequency with springs that are relatively less stiff than those that would be utilized if the entire slider were actuated. By utilizing relatively flexible springs, the low mass microactuator of the present invention enables relatively large travel with less actuation force. A comb-type microactuator also has the advantage of enabling relatively large displacement as compared to a parallel plate actuator. Voltage-in/displacement-out control of the microactuator has an advantage over voltage-in/acceleration-out control in that it is less complicated because it does not require a position sense signal and feedback circuit to implement.

Specifically, the present invention provides a disc drive data storage system having a disc mounted to a motor, a slider connected to the distal end of an access arm such that the trailing edge of the slider is disposed adjacent the rotating surface of the disc, a comb-type microactuator mounted on the trailing edge of the slider wherein the microactuator includes a stator portion and a rotor portion and a transducer mounted to the rotor portion. The rotor portion of the microactuator and the transducer have a total mass of less than 100 µg, preferably less than 50 µg and ideally less than 10 µg. The microactuator may include a plurality of stator portions and rotor portions connected in parallel. A control circuit may be used to supply signals to the microactuator such that the microactuator has a displacement output of preferably approximately ±10 µm or more in response to a voltage input signal of preferably less than about 12 volts.

The stator portion of the microactuator may include a plurality of parallel electrodes mounted on a column. Similarly, the rotor portion may include a plurality of parallel electrodes mounted on another column such that the rotor electrodes are positioned between and parallel to the stator electrodes. The rotor portion may include a transducer mounting surface connected to a spring which is also connected to the slider such that the rotor electrodes move in a substantially parallel path relative to the stator electrodes.

The present invention provides a method of manufacturing a microactuator for use in a disc drive data storage system. The method includes the steps of providing a slider substrate and depositing alternating layers of sacrificial material and stator electrode material onto the substrate. A stator slot and a rotor slot are formed in the alternating layers and a rotor electrode material is deposited into the rotor slot. The sacrificial material is then removed to expose parallel stator electrodes mounted on a column and parallel rotor electrodes mounted on another column such that the rotor electrodes are positioned between and parallel to the stator electrodes.

BRIEF DESCRIPTION OF THE DRAWINGS

FIG. 1 is a plan view of selected components of the disc drive system of the present invention.

FIG. 2 is a top view of the microactuator assembly of the present invention.

FIGS. 3–18 illustrate a top view of a manufacturing process for making a portion of the microactuator assembly.

DETAILED DESCRIPTION OF THE PREFERRED EMBODIMENTS

The following detailed description should be read with reference to the drawings in which like elements in different drawings are numbered identically. The drawings, which are not necessarily to scale, depict selected embodiments and are not intended to limit the scope of the invention.

Examples of materials, dimensions and manufacturing processes are provided for some selected elements. Those skilled in the art will recognize that many of the examples provided have suitable alternatives which may also be utilized.

It is also contemplated that the present invention is suitable for use with optic, magneto-optic and other types of disc drives. By way of example, not limitation, the following detailed description illustrates the application of the invention to magnetic disc drive systems.

Refer now to FIG. 1 which illustrates selected components of the disc drive system of the present invention. The disc drive system of the present invention includes one or more rigid discs 11 including a magnetizable medium coated on each side or surface 12 of the disc. The discs 11 are rigidly mounted on a spindle 14 of a spindle motor (not shown) to form a stack of spaced-apart discs rotatable about an axis of rotation 15. The magnetizable medium coated on the disc surface 12 may include one or more tracks 13 to organize data thereon. Adjacent the disc surface 12 is a slider 22 that flies above the disc surface 12 due to aerodynamic properties of the slider relative to the rotating disc 11. The slider 22 includes an air bearing surface (not shown) which faces the disc surface 12 and creates the aerodynamic lift. The slider 22 includes a transducer 23 (as best seen in FIG. 2) that reads and/or writes digital data to the magnetic disc surface 12. Transducer 23 may be an inductive type transducer capable of both reading and writing digital information to the disc surface 12 and it may be used alone or in conjunction with an MR (magnetoresistive) type transducer capable of reading digital data from the disc surface 12.

In order to maintain the transducer 23 in close proximity to the disc surface 12, a primary suspension assembly 19 is connected to the slider 23. The primary suspension assembly includes a proximal load beam portion 20 and a distal gimbal portion 21. The load beam 20 transfers a preload force to the slider in a direction opposite to the aerodynamic lift. The distal gimbal portion 21 of the primary suspension assembly 19 allows the slider 22 to move in the pitch and roll directions. The preload force from the load beam 20 is applied to the microactuator assembly 30 through gimbal 21.

The proximal end of the load beam 20 is connected to the distal portion of the primary actuator 10. The primary actuator 10 includes a proximally mounted voice coil 17 and a distally mounted arm extension 16. The distal end of the arm extension 16 is connected to the proximal end of the load beam 20. The voice coil 17 interacts with a magnet (not shown) to affect controlled rotation of the primary actuator 10 about an axis of rotation 18. In this manner, the primary actuator 10 moves the slider 22 from track to track 13 across the surface 12 of the disc 11 in order to read and/or write information to and from desired locations on the disc surface 12.

Refer now to FIG. 2 which illustrates a top view of the microactuator assembly 30 of the present invention. The microactuator assembly 30 includes a plurality of stator portions rigidly connected to the trailing edge of the slider 22. Each stator portion of the microactuator assembly 30 includes a stator column 32 separated by a stator insulator 33. A plurality of electrodes 36 are connected to the stator columns 32. Stator columns 32 and stator electrodes 36 are preferably made from a conductive material such as tungsten, titanium, molybdenum or other suitable metal. The stator insulators 33 may be formed of $Si_3N_4$ or other suitable electrically insulating material.

Microactuator assembly 30 also includes a plurality of rotor portions, each including a rotor column 34 and associated rotor electrodes 38. The rotor columns 34 and the rotor electrodes 38 may be made from the same material as the stator columns 32 and stator electrodes 36. The rotor columns are connected in parallel to a transducer mounting surface 40. The transducer mounting surface 40 may be made of the same material as the rotor columns 34 and the rotor electrodes 38. The transducer mounting surface 40 provides a location to mount the transducer 23 thereon.

Each end of the transducer mounting surface 40 is connected to a spring 42. One end of each spring 42 is connected to the transducer mounting surface 40 and the other end of each spring 42 is connected to the slider 22. Springs 42 permit the transducer mounting surface 40 and the transducer 23 to move in a substantially lateral direction as indicated by arrow 44. The springs 42 may be made from singular beams or from multiple narrow beams substantially as described in co-pending application Ser. No. 09/148,178 entitled MICROACTUATOR SUSPENSION WITH MULTIPLE NARROW BEAMS AND METHOD OF MANUFACTURE which is hereby incorporated in its entirety by reference.

The rotor electrodes 38 are positioned between and parallel to the stator electrodes 36. The springs 42 permit the transducer mounting surface 40 to move in a substantially lateral direction thus permitting the rotor electrodes to move in a substantially parallel path relative to the stator electrodes 36. The parallel path movement of the rotor electrodes 38 relative to the stator electrodes 36 is referred to herein as a comb-type microactuator. The comb-type microactuator 30 of the present invention differs from a parallel plate type microactuator in that a comb-type microactuator permits greater lateral displacement. For example, the parallel plate type microactuator as described in the paper entitled AN ELECTROSTATIC MICROACTUATOR FOR A MAGNETIC HEAD TRACKING SYSTEM OF HARD DISC DRIVES by S. Nakamura permits lateral displacement of only approximately 0.5 micrometers. By contrast, the comb-type microactuator 30 of the present invention permits lateral displacement of preferably approximately 10 micrometers.

The rotor electrodes 38 are in electrical communication with the rotor columns 34 and the transducer mounting surface 40. In a similar manner, the stator electrodes 36 are in electrical communication with the stator columns 32. A control circuit 46 is provided to control the displacement 44 of the microactuator assembly 30 by applying different voltages to the stator electrodes 36 and the rotor electrodes 38. The control circuit 46 communicates with the rotor electrodes 38 by way of rotor column 34, transducer mounting surface 40 and a suitable electrical connector 48a. The control circuit 46 communicates with the left hand side of the stator electrode 36 by way of left hand stator columns 32 and a suitable connector 48b. In a similar manner, the control circuit 46 communicates with the right hand stator electrodes 36 by way of right hand stator columns 32 and a suitable connector 48c. In this way, the lateral displacement 44 may be controlled by varying the electrostatic attraction between the stator electrodes 36 and the rotor electrodes 38. Electrostatic attraction between the rotor electrodes 38 and the stator electrodes 36 may be selectively controlled by varying the electrical signals from control circuit 46. For example, if the right hand side of the stator electrodes 36 receives a signal from control circuit 46 of V+ and the rotor electrodes 38 receive a signal from the control circuit of V−, principles of electrostatic attraction cause the rotor electrodes 38, the rotor columns 34 and the transducer mounting surface 40 to move in the right hand direction. In a similar way, the control circuit 46 may apply a V+ signal to the left hand side of the stator electrodes 36 and a V− signal to the rotor electrodes 38 causing the rotor electrodes 38, the rotor columns 34 and the transducer mounting surface 40 to move in a left hand direction. For example, a primary signal may be sent to one side of the electrodes 36, 38 and a bias signal may be sent to the other side of the electrodes. The primary signal and the bias signal may be varied to cause controlled movement of electrodes 38 or the signals may be balanced to cause the electrodes 38 to remain stationary. A combination of signals may be applied to the stator electrodes 36 and the rotor electrodes 38 to selectively control the right handed and left handed displacement 44 of the transducer mounting surface 40 and the transducer 23.

As illustrated in FIG. 2, the microactuator assembly 30 incorporates four sets of rotor columns 34 and corresponding electrodes 38. It is contemplated, however, that any number of rotor sets may be utilized, depending on the amount of microactuation force desired and the space available. The magnitude of the signal from the control circuit 46 may also be varied to modify the amount of force generated by each rotor/stator set. Preferably, the control circuit 46 provides a signal of 12 volts or less to the rotor/stator sets in order to produce a displacement of +/−10 micrometers.

The final microactuator structure 30 as illustrated in FIG. 2 and as partially illustrated in FIG. 18 preferably has a stator electrode 36 and rotor electrode 38 length of approximately 25 micrometers and an overlap of approximately 10 micrometers with spacing of approximately 15 micrometers. These dimensions result in a potential travel range of approximately +/−15 micrometers and a practical travel range of approximately +/−10 micrometers given typical forces generated by the rotor/stator sets. The gap spacing between electrodes 36, 38 and the thickness of electrodes 36, 38 are preferably approximately 1 micrometer or less. However, it is contemplated that the electrode gap spacing and the electrode thickness may be as low as 0.1 micrometer, assuming a 30 kHz minimum natural frequency of the microactuator 30. The gap spacing and the electrode thickness may be varied by varying the deposition time in the manufacturing process described herein. Smaller gaps result in a greater force per gap for the identical voltage. Also, thinner gaps result in more electrodes in the same space. As such, it is desirable to minimize gap space and electrode thickness.

The preferred gap size is primarily influenced by mechanical constraints such as flatness, straightness and parallelness of the electrodes 36, 38 and the stability of the support structure comprising the slider 22 and the springs 42. It is believed that the required gap size will not be substantially influenced by a requirement for electrical insulation, because the electrical breakdown strength of air of atmospheric pressure reaches a minimum of about 300 volts at 7.5 micron spacing and then increases sharply for smaller gaps. As such, it is contemplated that gaps of 1 micrometer or less are possible.

Although the procedure for fabrication of the transducer 23 is not described herein, the transducer 23 may be fabricated on transducer mounting surface 40 (also layer 74 shown in FIG. 17) using conventional techniques. However, it may be necessary to have a more planar substrate for mounting the transducer 23, such that it may be necessary to deposit another layer on top of the transducer mounting surface 40 and subsequently lap the additional layer to make it more planar.

Although the method of manufacturing the support springs 42 has not specifically been described herein, it is contemplated that conventional techniques may be utilized. In particular, it is contemplated that the support springs 42 may be fabricated near the end of the manufacturing process (e.g., immediately prior to removing the sacrificial layers as described with reference to FIG. 18). One option is to deposit the springs on the sides of the microactuator assembly after the transducer 23 has been mounted thereon. Another option is to build the springs into the slider 22 substrate and connect the springs 42 to bottom of the transducer mounting surface 40. In this later option, the space between the springs 42 and the slider 22 substrate would be filled with a temporary material that would be subsequently removed by a suitable etching process as discussed with reference to FIG. 18.

The force that may be generated by the microactuator assembly 30 depends on the applied voltage by the control circuit 46, the gap size (length and width), and the number of active gaps (i.e., one gap for each rotor electrode 38 surface that mates with a stator electrode 36 surface). This force (F) may be given by Equation 1 as follows:

$$F = n \frac{\epsilon_0 t V^2}{2d} \quad \text{Equation 1}$$

where $\epsilon_0$ equals $8.854 \times 10^{-12}$ N/m (permittivity of free space); t=total height of electrode plates in meters; V=voltage between electrodes in volts; d=electrode spacing (i.e., the gap) in meters; and n=number of active gaps. If a bias signal is utilized as discussed previously, $V^2$ would be replaced with $(V_L - V_R)^2$ where $V_L$ is the primary voltage between electrodes on the left side and $V_R$ is the bias voltage between electrodes on the right side.

Each individual rotor electrode 38 has an active top and bottom gap. Only one side from right to left is active at once. This results in the number of active gaps being twice the number rotor electrodes 38. The number of rotor electrodes 38 is limited by the total stack height available for the microactuator and is further limited by the electrode thickness and the gap between electrodes. The total stacked height may be limited by either space constraints or by cost and yield considerations. The cost will increase with increased stack height due to longer deposition times, and yield is likely to decrease as the stack height increases.

The width of a single rotor/stator set is preferably approximately 100 micrometers. Assuming a total microactuator 30 width of 300 micrometers (approximately one-third of the slider width), there is sufficient space for three rotor/stator sets to be arranged in parallel side by side. Although four rotor/stator sets are illustrated in FIG. 2, it is contemplated that any number of sets may be utilized depending on size and force constraints. The thickness of the microactuator 30 may be equal to or slightly less than the thickness of the finished slider, which is preferably approximately 300 micrometers. As can be seen in FIGS. 2 and 18, the total height (h) required is the thickness of the stator electrodes 36 plus the rotor electrodes 38 plus the gap therebetween. The number of active gaps (n) in each rotor/stator set is given by Equation 2 where the gap spacing is equal to $L_{gap}$ and the electrode thickness is equal to $L_{elec}$.

$$n = \frac{h - L_{elec}}{L_{gap} + L_{elec}} \quad \text{Equation 2}$$

Assuming a total height (h) of 25 micrometers and a gap spacing ($L_{gap}$) equal to the thickness of the electrodes ($L_{elec}$) of 1 μm, there are 12 (n) possible gaps per rotor/stator set as desired from Equation 2. Assuming a slider 22 has sufficient space for three sets, a total of 36 active gaps are present. Note that if the electrode thickness and the gap spacing are reduced to 0.5 micrometers, there will be sufficient space for 72 active gaps.

Calculating the force from Equation 1 wherein the height of the plates (t) is 250 micrometers, the resulting force as a function of the applied voltage is illustrated in Table 1 below:

TABLE 1

| Voltage (V) | Force (μN) | |
|---|---|---|
| | n = 36, gap = 1 μm | n = 72, gap = 0.5 μm |
| 10 | 4.0 | 16 |
| 12 | 5.7 | 23 |
| 15 | 9.0 | 36 |
| 20 | 15.0 | 64 |
| 30 | 35.8 | 143 |
| 40 | 63.7 | 254 |
| 50 | 99.5 | 398 |
| 80 | 254.7 | 1018 |
| 100 | 398.0 | 1590 |

For a moving mass (total mass of rotor portion and transducer) of 10 micrograms and a natural frequency of 8 kHz, the spring constant must be 25 N/m. For a displacement of +/−10 micrometers, the required force is 250 μN. As can be seen from Table 1, an applied voltage of 80 volts is required for 1 μm gap and an applied voltage of 40 volts is required for a 0.5 μm gap.

Although a voltage-in/displacement-out control circuit 46 is preferred, it is contemplated that lower applied voltages may be utilized if a more flexible spring 42 is utilized control circuit 46 is a voltage-in/acceleration-out control circuit having a feedback and position signal to control the position of the transducer. For example, a 1 kHz natural frequency system requires a spring constant of 0.39 N/m. At a desired defection of 10 micrometers, only 3.9 μN of force are required to deflect the springs 42. With this voltage-in/acceleration-out system, only 10 μN are required to counter the effect of a 100 g acceleration such that +/−10 micrometer travel could be controlled during 100 g seek operations with a drive voltage of only 10 volts.

Refer now to FIGS. 3–18 which illustrate a manufacturing process of the present invention. The manufacturing process illustrated in FIGS. 3–18 is directed to the manufacture of one set of rotor/stator electrodes. As mentioned previously, it is contemplated that one or more rotor/stator electrodes may be utilized. Accordingly, those skilled in the art will recognize that the following manufacturing method may be modified to accommodate the desired number of rotor/stator sets.

The method described with reference to FIGS. 3–18 provides a means to manufacture the microactuator assembly 30 at the wafer level. The microactuator assembly 30 is fabricated by depositing multiple layers of material which can be selectively etched laterally after a vertical trench. The method of manufacturing the microactuator assembly 30 reduces costs of manufacture by eliminating the extra steps associated with mounting a separate microactuator on the slider by fabricating the microactuator 30 directly on the slider. After the rotor/stator set or sets have been formed, the transducer 23 may be fabricated on top of the microactuator assembly 30 and the springs 42 may be fabricated on the sides of the microactuator assembly 30 followed by normal bar level processing.

Refer now to FIG. 3 which illustrates the initial step in manufacturing a single rotor/stator set of a microactuator assembly of the present invention. A series of layers 50/52 are applied to a substrate material, preferably the slider itself 22. The multilayer portion 50/52 comprises alternating layers of stator electrode material 50 and first sacrificial material 52. The stator electrode material 50 will eventually become the stator electrodes 36 and may be made from any suitable metal described herein or other electrically conductive material. The first sacrificial material 52 may be made from any material compatible with the deposition and selective etching processes used during the manufacturing process. For example, the first sacrificial material 52 may be aluminum deposited by chemical vapor deposition (CVD). The stator electrode material 50 may also be deposited by CVD and may comprise a suitable metal such as tungsten, titanium or molybdenum. Other possible deposition techniques to produce the layered structure 50/52 include electroplating, evaporation and sputtering.

Refer now to FIG. 4 which illustrates a pattern resist 54 as applied to the top layer of the sacrificial material 52. The pattern resist 54 defines the profile of the trench etch 56 as best seen in FIG. 5. Preferably, the trench etch 56 is formed using a non-selective, vertical etch technique.

After the trench etch slots 56 have been formed as illustrated in FIG. 5, the sacrificial material 52 is etched back slightly to form a plurality of recesses 58 as illustrated in FIG. 6. The recesses 58 provide mechanical interlocking to the subsequently deposited materials. It is contemplated however, that the recesses 58 may be omitted if there is adequate adhesion between the stator electrode material 50 and the subsequent deposition materials.

After the sacrificial material 52 has been etched back to form the recesses 58 (if desired), the pattern resist 54 is removed from the top surface. As illustrated in FIG. 7, after the pattern resist 54 is removed, stator column material 60 is applied over the top surface of the sacrificial material 52 and the inside of the trench 56 thus forming a connection to the stator electrode material 50. Preferably, a chemical vapor deposition process is utilized to apply the stator column material 60, given its conformal nature.

With reference now to FIG. 8, a vertical etch process is utilized to remove the stator column material 60 from the bottom of the trench 56 and to remove the stator column material 60 from the top surface of the sacrificial material 52. This electrically isolates the stator columns 32 as formed by the stator column material 60.

With reference to FIG. 9, the trench 56 is filled with an insulation material 62 such as $Si_3N_4$ or other suitable material. A pattern resist 54 is again applied to the top surface to define the profile of the rotor trench 62 as illustrated in FIG. 10. The rotor trench 62 is preferably formed using a non-selective, vertical etch technique.

With reference to FIG. 11, the inside portion of the stator electrode material 50 is selectively etched by an isotropic process to form a series of recesses 66. The recesses 66 are subsequently filled by a second sacrificial material 68 as seen in FIG. 12. The second sacrificial material 68 is preferably a different material than the first sacrificial material 52.

With reference to FIG. 13, the second sacrificial material 68 is removed from the top surface of the pattern resist 54 and the inside of the rotor trench 64, while remaining in the recesses 66. The second sacrificial material 68 may be removed utizilizing an isotropic selective etch technique, stopping before the sacrificial material 68 is removed from the recesses 66.

With reference to FIG. 14, the first sacrificial material 52 inside the rotor trench 64 is partially removed to form recesses 70 therein. The recesses 70 are preferably formed using a isotropic selective etch process which selectively etches the first sacrificial material 52, without affecting the second sacrificial material 68. In this way, it is preferred that the first sacrificial material 52 be different from the second sacrificial material 68.

Refer now to FIG. 15 which illustrates the removal of the insulating material 62 from the top surface. The insulating material 62 may be removed from the top surface by utilizing selective and/or vertical etch processing techniques.

As seen in FIG. 16, a third temporary sacrificial material 72 is applied to the top surface and inside surface of the rotor trench 64. The third sacrificial material 72 forms a temporary substrate for subsequent deposition of the rotor electrode material 74. The third sacrificial material 72 may be the same as the first sacrificial material 52 or the second sacrificial material 68.

With reference to FIG. 17, the rotor electrode material 74 is deposited over the entire surface of the third sacrificial material 72. The rotor electrode material 74 is preferably the same as the stator electrode material 50.

With reference to FIG. 18, the sacrificial material 52, 68, 72 is removed by a suitable etching process. Prior to removing the sacrificial materials, the transducer 23 may be secured to the rotor electrode material 74/40. In addition, prior to removing the sacrificial material, the microactuator assembly and slider may be sliced into individual bars if multiple microactuators and sliders are manufactured in one piece. As seen in FIG. 18, the stator electrode material 50 becomes the stator columns 32 and the stator electrodes 36. Additionally, the rotor electrode material 74 becomes the transducer mounting surface 40, the rotor column 34 and the rotor electrodes 38.

Although the present invention has been described with reference to preferred embodiments, workers skilled in the art will recognize that changes may be made in form and detail without departing from the spirit and scope of the invention.

What is claimed is:

1. A disc drive data storage system, comprising:
   a disc mounted to a motor for rotating the disc about an axis, the disc having a surface for storing data thereon;
   an access arm having a proximal end and a distal end;
   a slider connected to the distal end of the access arm and disposed adjacent the disc surface;

a comb microactuator mounted on the slider, the microactuator including a stator portion having fingers and a rotor portion having fingers interdigitated with the fingers on the stator portion; and a transducer mounted on the rotor portion of the microactuator, such that actuation of the microactuator moves the transducer relative to the slider in a direction generally parallel to the fingers.

2. A disc drive data storage system as in claim 1, wherein the rotor portion and the transducer have a total mass less than 100 μg.

3. A disc drive data storage system as in claim 1, wherein the rotor portion and the transducer have a total mass less than 50 μg.

4. A disc drive data storage system as in claim 1, wherein the rotor portion and the transducer have a total mass less than 10 μg.

5. A disc drive data storage system as in claim 1, wherein the microactuator includes a plurality of stator portions and rotor portions connected in parallel.

6. A disc drive data storage system as in claim 5, further comprising:

a control circuit for supplying signals to the microactuator, the microactuator having a displacement output in response to a voltage input signal from the control circuit.

7. A disc drive data storage system as in claim 6, wherein the voltage input signal is approximately 12 volts or less.

8. A disc drive data storage system as in claim 7, wherein the rotor has a travel of approximately ±10 μm or more.

9. A disc drive data storage system as in claim 5, further comprising:

a control circuit for supplying signals to the microactuator, the microactuator having an acceleration output in response to a voltage input signal from the control circuit.

10. A disc drive data storage system as in claim 1, wherein:

the stator portion includes a plurality of parallel electrodes mounted on a first column, the first column connected to the slider;

the rotor portion includes a plurality of parallel electrodes mounted on a second column; the rotor electrodes positioned between and parallel to the stator electrodes;

a transducer mounting surface connected to the second column;

a spring having a first portion connected to the slider and a second portion connected to the transducer mounting surface such that the rotor electrodes may move in a substantially parallel path relative to the stator electrodes.

11. A disc drive data storage system as in claim 10, wherein the microactuator includes a plurality of stator portions and rotor portions connected in parallel.

12. A disc drive data storage system as in claim 11, further comprising:

a control circuit for supplying signals to the microactuator, the microactuator having a displacement output in response to a voltage input signal from the control circuit.

13. A disc drive data storage system as in claim 12, wherein the voltage input signal is approximately 12 volts or less.

14. A disc drive data storage system as in claim 13, wherein the rotor has a travel of approximately ±10 μm or more.

15. A disc drive data storage system as in claim 11, wherein the rotor portion, the transducer mounting surface and the transducer have a total mass less than 100 μg.

16. A disc drive data storage system as in claim 11, wherein the rotor portion, the transducer mounting surface and the transducer have a total mass less than 50 μg.

17. A disc drive data storage system as in claim 11, wherein the rotor portion, the transducer mounting surface and the transducer have a total mass less than 10 μg.

18. A disc drive data storage system, comprising:

a disc mounted to a motor for rotating the disc about an axis, the disc having a surface for storing data thereon;

an access arm having a proximal end and a distal end;

a slider connected to the distal end of the access arm and disposed adjacent the disc surface;

a comb microactuator mounted on the slider, the microactuator including a stator portion having fingers and a rotor portion having fingers interdigitated with the fingers on the stator portion; and a transducer mounted on the rotor portion of the microactuator, such that actuation of the microactuator moves the transducer relative to the slider a distance of at least 10 μm in a direction generally parallel to the fingers.

* * * * *